United States Patent
Noorani

(10) Patent No.: US 11,068,993 B1
(45) Date of Patent: Jul. 20, 2021

(54) SMART ENGINE RISK ASSESSMENTS

(71) Applicant: United Services Automobile Association (USAA), San Antonio, TX (US)

(72) Inventor: Ameer Noorani, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 27 days.

(21) Appl. No.: 16/259,220

(22) Filed: Jan. 28, 2019

Related U.S. Application Data

(60) Provisional application No. 62/623,862, filed on Jan. 30, 2018.

(51) Int. Cl.
*G06Q 40/08* (2012.01)
*G06N 20/00* (2019.01)
*H04L 29/08* (2006.01)

(52) U.S. Cl.
CPC ............. *G06Q 40/08* (2013.01); *G06N 20/00* (2019.01); *H04L 67/22* (2013.01)

(58) Field of Classification Search
CPC ........ G06Q 40/08; G06Q 40/00; G06N 20/00; G06N 20/10; G06N 20/20; H04L 67/22; H04L 67/00
See application file for complete search history.

(56) References Cited

U.S. PATENT DOCUMENTS

| | | | |
|---|---|---|---|
| 2003/0176931 A1* | 9/2003 | Pednault | G06N 20/00 700/31 |
| 2008/0255888 A1* | 10/2008 | Berkobin | G06Q 40/08 705/4 |
| 2010/0241464 A1* | 9/2010 | Amigo | A61B 5/1123 705/4 |
| 2012/0123806 A1* | 5/2012 | Schumann, Jr. | G06Q 40/08 705/4 |
| 2012/0296676 A1* | 11/2012 | Burgoon, Jr. | G06Q 40/08 705/4 |
| 2014/0136242 A1* | 5/2014 | Weekes | G06Q 40/08 705/4 |
| 2018/0018741 A1* | 1/2018 | Mukherjee | G06N 3/126 |

* cited by examiner

*Primary Examiner* — Namrata Boveja
*Assistant Examiner* — Divesh Patel
(74) *Attorney, Agent, or Firm* — Fish & Richardson P.C.

(57) ABSTRACT

Systems, methods, and computer-readable medium storing instructions can be used to predict insurance information. One of the methods includes obtaining information about an insured entity. The method includes providing the information to a machine learning system, the machine learning system trained to provide insurance information based on the provided information. The method includes in response to providing the information, receiving a prediction of the insurance information. The method also includes adjusting an insurance premium based on the prediction.

16 Claims, 4 Drawing Sheets

SMART ENGINE RISK ASSESSMENTS

CROSS-REFERENCE TO RELATED APPLICATION

This application claims priority to U.S. Provisional Application Ser. No. 62/623,862, filed on Jan. 30, 2018. The disclosure of the prior application is considered part of and is incorporated by reference in the disclosure of this application.

TECHNICAL FIELD

This disclosure generally relates to systems and methods for predicting insurance information using one or more machine learning techniques.

BACKGROUND

Insurance is a means of protection from financial loss. It is a form of risk management primarily used to hedge against the risk of a contingent, uncertain loss. Typical insurance transactions can involve the insured assuming a guaranteed and known relatively small loss in the form of payment to the insurer in exchange for the insurer's promise to compensate the insured in the event of a covered loss. The loss may or may not be financial, but it is generally reducible to financial terms, and involves something in which the insured has an insurable interest established by ownership, possession, or preexisting relationship.

SUMMARY

Implementations of the present disclosure are generally directed to predicting insurance information. More specifically, implementations are directed to using machine learning techniques, such as deep learning that includes classification, clustering, and/or other techniques, to determine metric(s) for insurance information that can be used to better allocate costs when compared to conventional technologies used for determining insurance information metrics.

In general, innovative aspects of the subject matter described in this specification can be embodied in methods that includes act of obtaining information about an insured entity. The method includes the act of providing the information about the insured entity to a machine learning system, the machine learning system trained to predict insurance information based on the provided information. The method includes the act of, in response to providing the information, receiving predicted insurance information. The method also includes the act of adjusting an insurance premium based on the predicted insurance information.

Implementations can include one or more of the following features. The information about the insured entity can include information collected from at least one of: an Internet of Things device or a sensor. The information about the insured entity can include information collected from financial transactions. The information about the insured entity can include information collected from social media. The predicted insurance information can include at least one of: a predicted number of claims or a predicted total value of claims over a predetermined time period. The methods may include the act of providing a recommendation of at least one action that could be taken to alter the predicted insurance information.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. By implementing machine learning techniques, the amount of information (data) about an insured entity that can be used to predict insurance information, such as predicting a number of filed claims and/or predicting a total value of filed claims over a predetermined time period, can substantially increase when compared with some conventional technologies used for predicting such insurance information. Thus, the systems and methods described herein can more accurately allocate risks then some conventional technologies. This can allow for a reduction in insurance premiums and costs associated with insuring entities.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
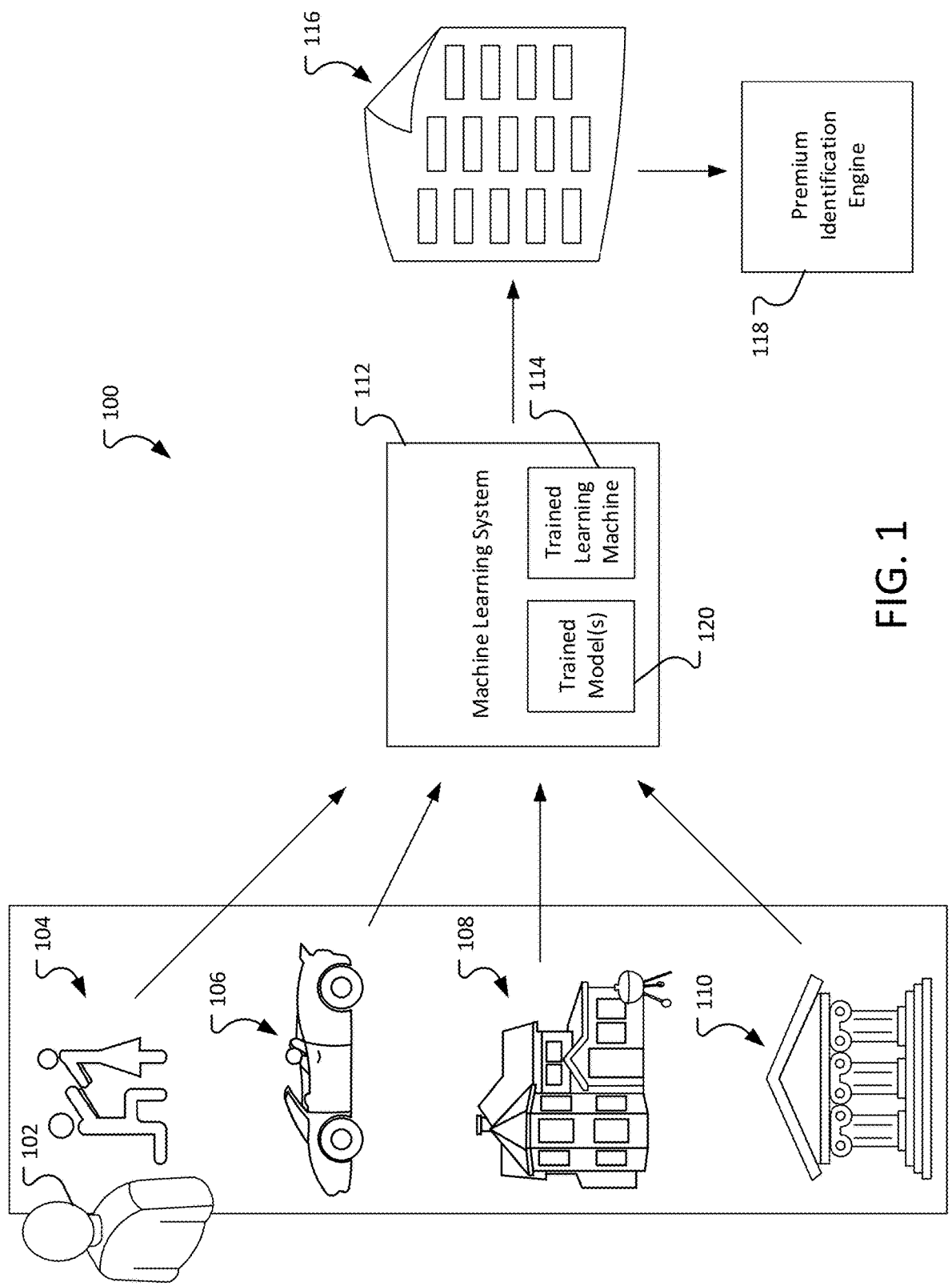
FIG. 1 depicts an example environment for allocating risk and determining insurance premiums, according to implementations of the present disclosure.

Insurance premiums are generally determined based on an estimate of the risk associated with an insurance claim. In some conventional technologies for estimating risk, the estimation of risk can tend to be general. One difference between providing insurance and selling other types of goods is that the actual cost of providing the insurance is unknown until the policy period has lapsed. Therefore, insurance rates are generally based on predictions rather than actual costs. Some conventional technologies determine rates by statistical analysis of past losses based on a limited number of variables. The variables tend to be ones that have the most predictive power, but they are far from perfect. As a consequence, some customers are charged too much for their insurance, while other customers are charged too little.

Today, more information is available about customers than ever before. If a customer buys an item with a credit card, there is a record of the purchase. Smart devices and sensors can provide a constant stream of information. Some devices monitor a customer's heart rate, exercise habits, etc. Other devices monitor the home, for example, when doors are locked or unlocked, the temperature of the water, electricity usage, temperature, and humidity information. Some sensors can be used to detect damage to the home. Devices in automobiles can rate the driver's driving habits, driving routes, frequency of use, accident detection, etc. Individuals also provide additional information about their lifestyle (for example, people post information on social networking sites describing their daily activities, eating habits, vacations, lifestyle, etc.)

This plethora of information is generally underused in the insurance industry. As a result, some users, who exhibit behaviors that reduce the likelihood and severity of a claim, subsidize other users, who do not exhibit these behaviors. The increased capabilities of machine learning can make it possible utilize this plethora or information to more accurately allocate risk and set premiums accordingly. For example, the information can be used with historic claims and payment amounts (or losses) in order to more accurately allocate risk (and therefore insurance premiums) across a base of insurance customers.

Implementations provide techniques for allocating risk and determining insurance premiums. One or more models may be developed using machine learning (ML), as described further below. In some implementations, one or more models may be trained, through supervised ML, using training data from historic activities taken by users and historic claims placed by those users. Training data may include, for each of one or more different individuals, information about those individuals, claims, and claim loss amounts. The models may be trained to output, based on training data. Accordingly, some implementations provide predicted claims and losses for users based on the additional information, and thus provide for a more complete allocation of risk across insured individuals. Moreover, once the models are sufficiently trained and/or refined to provide accurate a mechanism to more accurately allocate risks and set premiums across a broad range of individuals.

FIG. 1 depicts an example environment 100 for allocating risk and determining insurance premiums, according to implementations of the present disclosure. As shown in FIG. 1, information about a user 102 may be collected. The information can include, for example, information about life events 104. Life events can include, but are not limited to, events such as an engagement, marriage, birth of a child, change of residence, enlistment in the military, discharge from the military, retirement, start of a new job, etc. The information can also include information about user behavior 106. User behavior can include, for example, driving history data, credit history data, daily exercise data, lifestyle data, etc.

The information can also include information about purchases 108. Purchases may refer to any goods purchased by the user, including but not limited to, an automobile, jewelry, home appliances, home systems, furniture, etc. Purchases may also refer to services engaged by the user. These services can include, but are not limited to, snow removal services, home repair services, contractors, automobile service, automobile repair, etc.

The information can also include financial information 110. Financial information can include, for example, information about assets and liabilities including savings, checking, investment accounts, retirement accounts, revolving credit accounts, mortgages, etc.

The collected information can be provided to a machine learning system 112. The machine learning system 112 can include a trained learning machine 114. The trained learning machine 114 can accept the collected information and produce a report 116 using one or more trained machine learning models 120. The report 116 can include an estimate of the claimable activities that are likely to occur. In some implementations, the report includes a projected likelihood that a user will have a claim and a projected amount of the losses for any claims. In some implementations, the report includes any of the above information segmented by time periods (for example, the likelihood that the user will have a claim in the next three months, the next six months, and the next year, the next five years, ten years (or any other duration of time); the amount of losses in anticipated claims in the next three months, the next six months, and the next year, the next five years, the next ten years, (or any other duration of time); etc. . . . ).

In some implementations, the environment may include a premium identification engine 118. The premium identification engine 118 may identify an appropriate premium for a particular type of insurance (for example, auto, personal article, home, renter, flood, etc.) based on the report 116.

Figure 2:
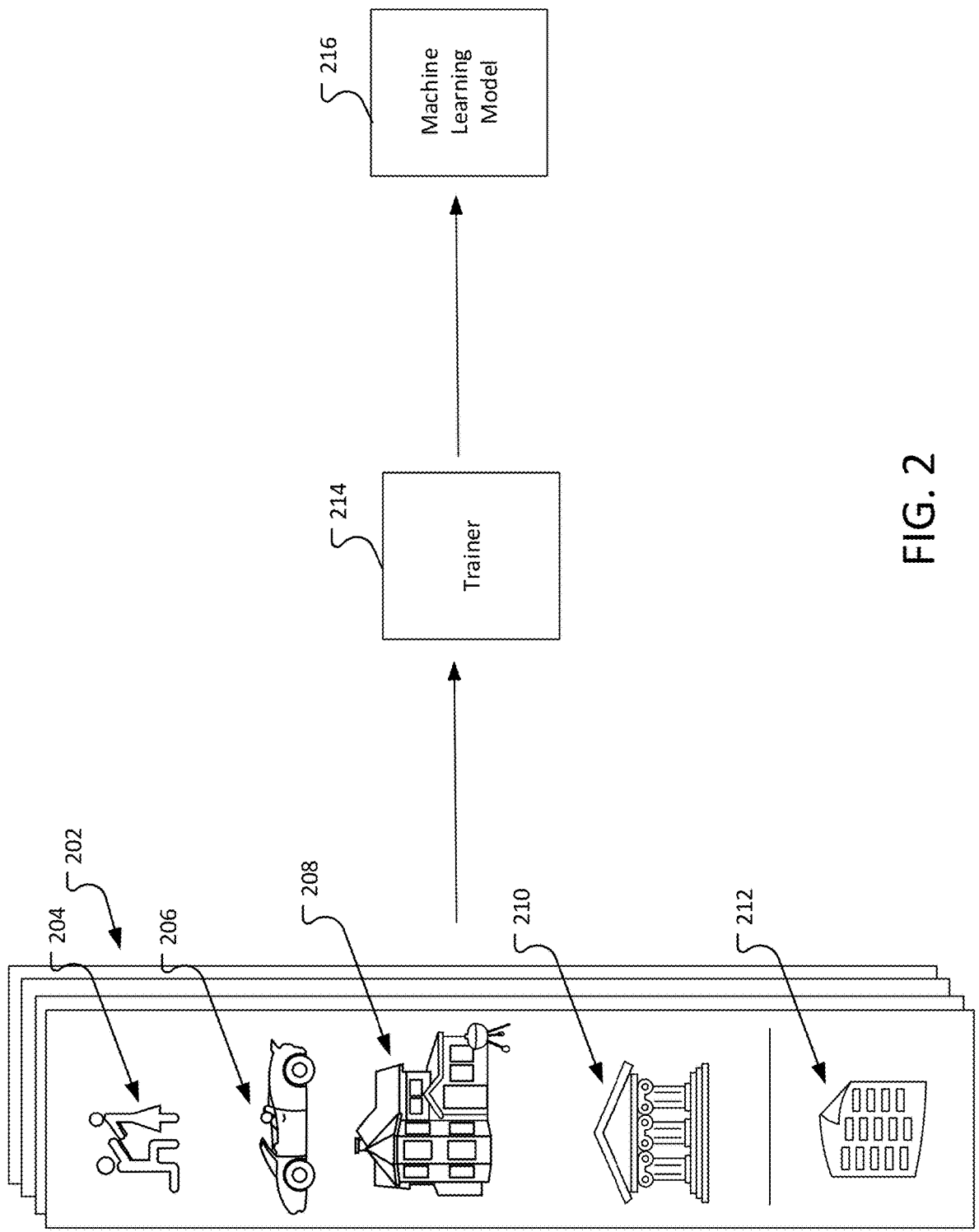
FIG. 2 depicts an example of training data used to generate the model(s) for determining likely claims, according to implementations of the present disclosure.

FIG. 2 depicts an example of training data 202 used to generate the model 216 for determining likely claims, according to implementations of the present disclosure. As shown in the example of FIG. 2, the training data 202 may include any suitable number of sets of training data. Each set of training data 202 include historic information about a user (including life event information 204, user behavior information 206, purchase information 208, and/or financial information 210). The set of training data may also include report information 212 associated with any claims and losses experienced by the user over one or more different timeframes.

Implementations are not limited to the particular example of training data 202 shown in FIG. 2, and may include less information, more information, differently formatted information, and so forth. As shown in the example, in some implementations, financial information may not be used.

In some implementations, the applied machine learning techniques include feature extraction to build different neurons within a neural network, where each neuron corresponds to a feature of the session records. The neural network can be one of several types of neural networks. In some implementations, the neural network is a convolutional neural network (CNN), a recurrent neural network, a radial basis function neural network, a Kohonen self-organizing neural network, and/or a modular neural network. One or more features may translate to one or more survey questions. For example, a particular feature may correspond to a piece or type of information, such that the strength of a feature present in a user information leads to a particular metric being determined for the corresponding report. Features may correspond to negative and/or positive influences on the report. A feature may correspond to one or more neurons that each indicates a characteristic of the report. In some instances, a feature may correspond to a particular relationship, or interrelationship, between multiple neurons.

In some implementations, each feature is associated with a different neural network, or sub-network, of multiple neurons, and the neural network may be developed based on supervised learning using the training data (e.g., labeled data). Unsupervised learning may also be employed. Implementations may employ feature engineering, learning curves, anomaly filtering, training algorithm(s), recurrent neural network(s), and/or other techniques.

In some implementations, a large sample of historical data (e.g., user information and associated claims and losses) may be employed to develop the model(s) 216. Such large sample may provide for the development of model(s) 216 that take into account a wide variance, among the historical information. A goal of the modeling may be to provide estimates or predictions of features, corresponding to claims and losses with at least a threshold degree of accuracy (e.g., at least 90% accurate).

Implementations may also employ unlabeled data to develop the model(s) 216. In some implementations, clustering techniques may be applied to develop the model(s) 216 based on unlabeled data. Clustering may determine sets (e.g., clusters) of individuals that are similar in some way with respect to their characteristics, such as purchase history, financial information, and so forth. Clustering may be described as self-classification without the use of labeled data.

Figure 3:
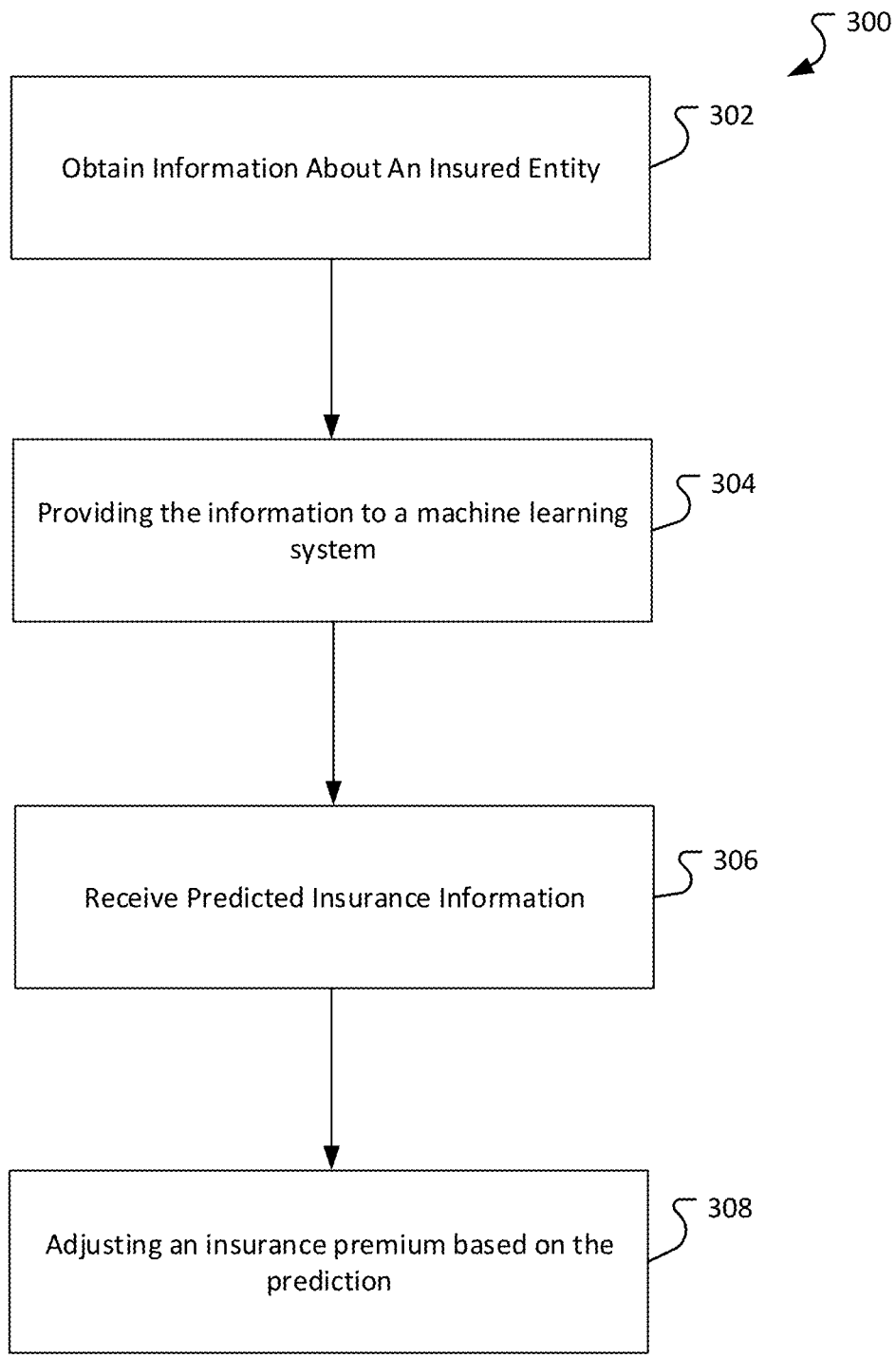
FIG. 3 depicts a flow diagram of an example process for determining insurance premiums using a machine learning system, according to implementations of the present disclosure.

FIG. 3 depicts a flow diagram of an example process 300 for determining insurance premiums based using a machine learning system, according to implementations of the present disclosure. Operations of the process may be performed by the machine learning system 112, the trained learning machine 114, the trained model(s) 120, and/or other software module(s) executing on the machine learning system 112 and/or elsewhere.

The process 300 obtains 302 information about an insured entity. The information can be collected from at different sources, including, Internet of Things devices (networked physical devices, vehicles, home appliances, and other items embedded with electronics, software, sensors, actuators, and network connectivity which enable these objects to connect and exchange data), sensors, financial transactions, and/or social media. The information may be obtained using information known by the insurance company, for example, the insurance company may include a bank or other financial institution. Obtaining the information can include obtaining customer records from accounts held by the bank of the another financial institution. In some implementations, obtaining the information may include obtaining information about a customer stored on a block chain. In some implementations, the block chain data may be shared across multiple institutions. I The process 300 provides 304 the information about the insured entity to a machine learning system, the machine learning system trained to provide insurance information based on the provided information about the insured entity.

In response to providing the information, the process 300 receives 306 predicted insurance information from the machine learning system. In some implementations, the predicted insurance information includes a predicted number of claims and/or a predicted total value of claims over a predetermined time period. In some implementations, the predicted insurance information is based on the information about the insured entity. For example, based on information about the insured entity gathered from social media (such as recent skydiving trips, recent engagement photos, etc.) and bank transaction information (e.g., recent alcohol/tobacco purchases, recent gym membership purchases, etc.) the machine learning system can predict a number of claims the insured entity might file and/or a total value of claims an insured entity may file over a predetermined time period.

The process 300 adjusts 306 an insurance premium based on the prediction.

Figure 4:
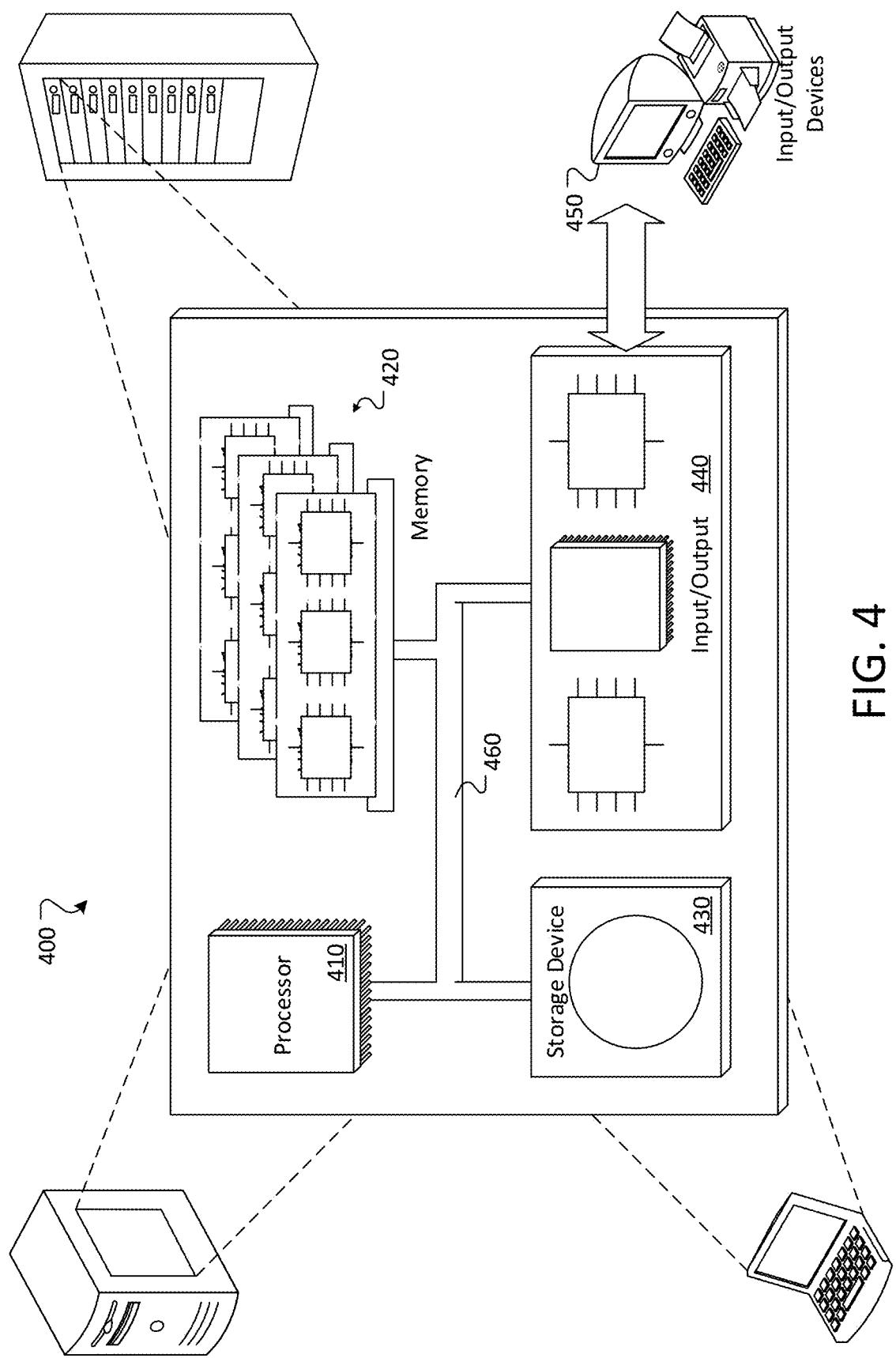
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   obtaining first sensor data from one or more first sensors regarding a home of a first insured entity, wherein the first sensor data is indicative of one or more characteristics of the home of the first insured entity;
   training a machine learning system comprising a neural network to predict, based on the first sensor data, a total value of claims filed by the first insured entity over a predetermined period such that the predicted total value of claims is within a threshold degree of accuracy, wherein training the machine learning system comprises:
      generating a report regarding the first insured entity based on the first sensor data,
      extracting a plurality of features from the first report, and
      generating a plurality of neurons for the neural network, wherein each of the neurons represents at least one of (i) a characteristic of the first report, or (ii) a relationship between two or more other neurons;
   obtaining second sensor data from one or more second sensors regarding a home of a second insured entity;
   processing the second sensor data using the trained machine learning system including the plurality of neurons to predict a corresponding total value of claims filed by the second insured entity over the predetermined period; and
   adjusting an insurance premium based on the predicted corresponding total value of claims filed by the second insured entity over the predetermined period.

2. The computer-implemented method of claim 1, wherein the total value of claims filed by the second insured entity over the predetermined period is predicted further based on information collected from an Internet of Things device of the second insured entity.

3. The computer-implemented method of claim 1, wherein the total value of claims filed by the second insured entity over the predetermined period is predicted further based on information collected from financial transactions of the second insured entity.

4. The computer-implemented method of claim 1, wherein the total value of claims filed by the second insured entity over the predetermined period is predicted further based on information collected from social media associated with the second insured entity.

5. The computer-implemented method of claim 1, further comprising providing a recommendation of at least one action that to be taken to alter the predicted corresponding total value of claims filed by the second insured entity over the predetermined period.

6. A system, comprising:
   at least one processor; and
   a memory communicatively coupled to the at least one processor, the memory storing instructions which, when executed by the at least one processor, cause the at least one processor to perform operations comprising:
      obtaining first sensor data from one or more first sensors regarding a home of a first insured entity, wherein the first sensor data is indicative of one or more characteristics of the home of the first insured entity;
      training a machine learning system comprising a neural network to predict, based on the first sensor data, a total value of claims filed by the first insured entity over a predetermined period such that the predicted total value of claims is within a threshold degree of accuracy, wherein training the machine learning system comprises:
         generating a report regarding the first insured entity based on the first sensor data,
         extracting a plurality of features from the first report, and
         generating a plurality of neurons for the neural network, wherein each of the neurons represents at least one of (i) a characteristic of the first report, or (ii) a relationship between two or more other neurons;
      obtaining second sensor data from one or more second sensors regarding a home of a second insured entity;
      processing the second sensor data using the trained machine learning system including the plurality of neurons to predict a corresponding total value of claims filed by the second insured entity over the predetermined period; and
      adjusting an insurance premium based on the predicted corresponding total value of claims filed by the second insured entity over the predetermined period.

7. The system of claim 6, wherein the total value of claims filed by the second insured entity over the predetermined period is predicted further based on information collected from at least one of an Internet of Things device of the second insured entity.

8. The system of claim 6, wherein the total value of claims filed by the second insured entity over the predetermined period is predicted further based on information collected from financial transactions of the second insured entity.

9. The system of claim 6, wherein the total value of claims filed by the second insured entity over the predetermined period is predicted further based on information collected from social media associated with the second insured entity.

10. The system of claim 6, wherein the operations further comprise providing a recommendation of at least one action that to be taken to alter the predicted corresponding total value of claims filed by the second insured entity over the predetermined period.

11. A non-transitory computer-readable media storing instructions which, when executed by at least one processor, cause the at least one processor to perform operations comprising:
   obtaining first sensor data from one or more first sensors regarding a home of a first insured entity, wherein the first sensor data is indicative of one or more characteristics of the home of the first insured entity;
   training a machine learning system comprising a neural network to predict, based on the first sensor data, a total value of claims filed by the first insured entity over a predetermined period such that the predicted total value of claims is within a threshold degree of accuracy, wherein training the machine learning system comprises:
      generating a report regarding the first insured entity based on the first sensor data,
      extracting a plurality of features from the first report, and
      generating a plurality of neurons for the neural network, wherein each of the neurons represents at least one of (i) a characteristic of the first report, or (ii) a relationship between two or more other neurons;
   obtaining second sensor data from one or more second sensors regarding a home of a second insured entity;
   processing the second sensor data using the trained machine learning system including the plurality of neurons to predict a corresponding total value of claims filed by the second insured entity over the predetermined period; and
   adjusting an insurance premium based on the predicted corresponding total value of claims filed by the second insured entity over the predetermined period.

12. The non-transitory computer-readable medium of claim 11, wherein the total value of claims filed by the second insured entity over the predetermined period is predicted further based on information collected from at least one of an Internet of Things device of the second insured entity.

13. The non-transitory computer-readable medium of claim 11, wherein the total value of claims filed by the second insured entity over the predetermined period is predicted further based on information collected from financial transactions of the second insured entity.

14. The non-transitory computer-readable medium of claim 11, wherein the total value of claims filed by the second insured entity over the predetermined period is predicted further based on information collected from social media associated with the sensor insured entity.

15. The non-transitory computer-readable medium of claim 11, wherein the operations further comprise providing a recommendation of at least one action that to be taken to alter the predicted corresponding total value of claims filed by the second insured entity over the predetermined period.

16. The computer-implemented method of claim 1, wherein the first sensor data comprises at least one of:
   a lock state of a door in the home of the first insured entity;
   a temperature of water in the home of the first insured entity;
   an electricity usage of the home of the first insured entity,
   a temperature in the home of the first insured entity, and
   a humidity in the home of the first insured entity.

* * * * *